UNITED STATES PATENT OFFICE.

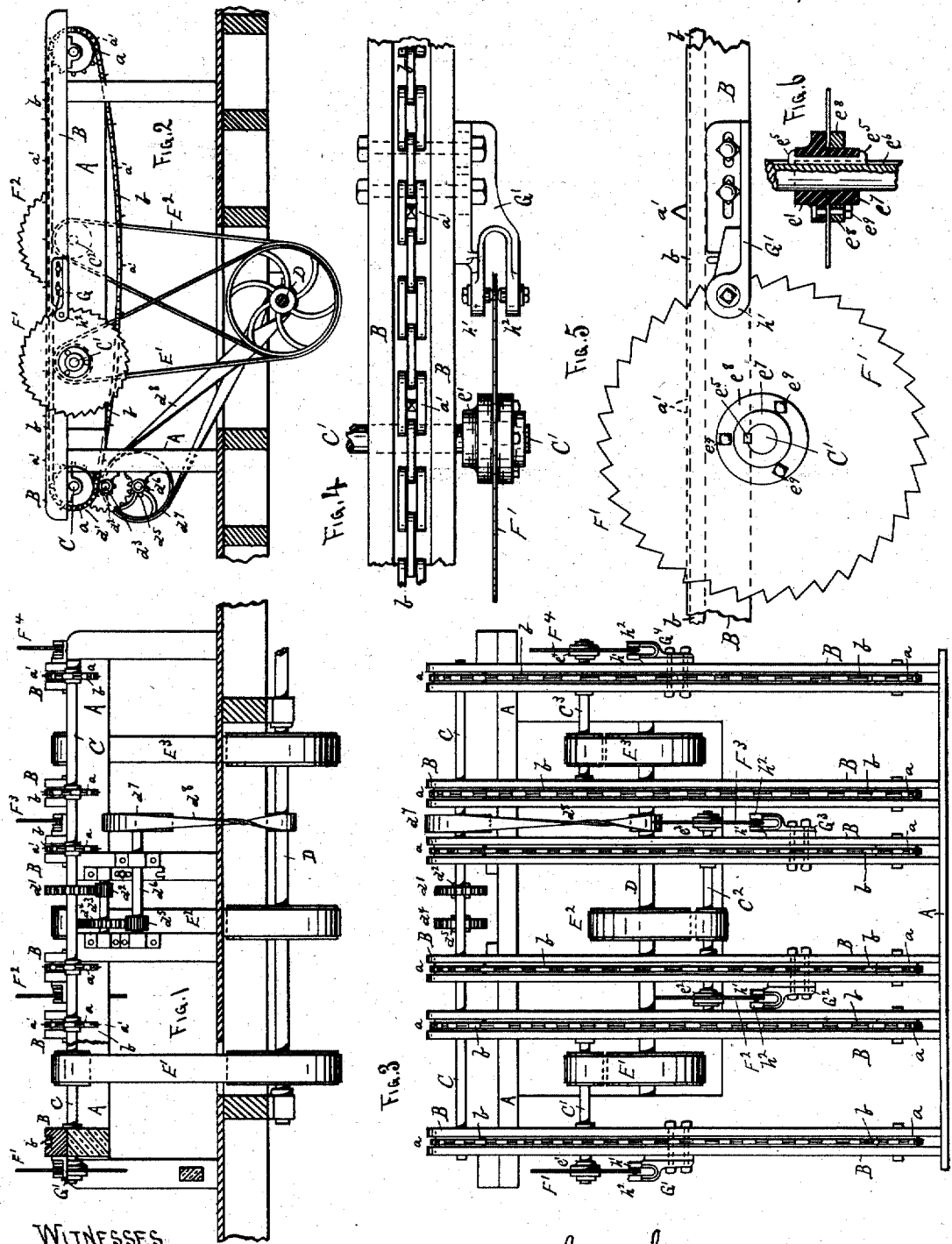

GEORGE GOWAN, OF SHELL LAKE, WISCONSIN.

CIRCULAR SAWING MACHINE.

SPECIFICATION forming part of Letters Patent No. 288,173, dated November 6, 1883.

Application filed May 17, 1883. (No model.)

*To all whom it may concern:*

Be it known that I, GEORGE GOWAN, a citizen of the United States, and a resident of Shell Lake, in the county of Burnett, in the State of Wisconsin, have invented certain new and useful Improvements in Sawing-Machines, of which the following specification is a full, clear, and exact description, reference being also had to the accompanying drawings.

This invention relates to machines for sawing slabs and similar material; and it consists in the construction and arrangement of parts herein shown and described, and then sought to be specifically defined by the claims.

In the drawings, Figure 1 is a rear elevation, Fig. 2 is a side elevation, and Fig. 3 is a plan view, of a slab-saw table, showing my improvements attached to the saws therein. Fig. 4 is an enlarged plan view, and Fig. 5 is an enlarged side view, of one of the saws and a portion of one of the feeding-chains and chain-guides detached. Fig. 6 is an enlarged sectional view of the "slip-collar" and mandrel.

This invention consists in arranging a series of saws, feeding mechanism, and guides for the saws, whereby one or more of the saws will be free to move laterally in event of cramping without affecting the remainder of the series and without breaking the cramped saw or saws.

The invention is peculiarly applicable to slab-sawing machines, and I have shown it applied to such a machine in the drawings, in which—

A is the frame-work, upon which a series of trough-shaped bars, B, are secured parallel to each other, as shown. In both ends of each of these bars B chain-sheaves $a$ are journaled, with their upper surfaces adapted to come about flush with the lower surfaces of the troughs in the bars B, and with their lower surfaces below the lower lines of the bars, so that when endless chains $b$ are passed around each pair of the sheaves $a$ in each bar B the upper parts of the chains travel in the grooves in the bars and the lower parts travel below the bars, the bars and grooves thus acting as guides and supports to the upper parts of the chains.

All the sheaves $a$ in all the bars B at the rear side of the frame A are mounted upon one shaft, C, having a gear, $d'$, attached to it, and adapted to be acted upon by a pinion, $d^2$, on a counter-shaft, $d^3$, secured to the frame A below the shaft C. $d^4$ is another gear mounted upon the counter-shaft $d^3$, and adapted to be acted upon by a pinion, $d^5$, upon a second counter-shaft, $d^6$, below the counter-shaft $d^3$. $d^7$ is a belt-pulley upon the counter-shaft $d^6$, adapted to be driven by a cross-belt, $d^8$, from a shaft, D, below the floor, upon which the frame A stands. This arrangement of gears and belts secures the requisite slow speed to the chains $a$. The chains $a$ will be provided with spurs and pins $a'$, to assist in feeding the slabs to the saws, as hereinafter shown.

$C'$ $C^2$ $C^3$ are three saw-mandrels, mounted in suitable bearings on the frame A below the bars B, and adapted to be driven by belts $E'$ $E^2$ $E^3$ from the shaft D. The central mandrel, $C^2$, has two saws, $F^2$ $F^3$—one upon each end—while the mandrels $C'$ $C^3$ have each one saw, $F'$ and $F^4$. I have shown three mandrels and four saws, but any number of saws may be used, as by increasing the width of the frame A each mandrel may be provided with two or more saws.

The bars B are arranged as shown, so that two of the chains $a$ and their supporting-bars B come between each pair of the saws, thus two of the bars and chains coming between the saws $F'$ and $F^2$, two coming between the saws $F^2$ and $F^3$, and two coming between the saws $F^3$ and $F^4$, the saws being usually about four feet apart. The mandrels are arranged so that the saws $F'$ and $F^4$ come in line, and the saws $F^2$ and $F^3$ come in line, so that they will not all act upon the lumber at the same time.

$e'$ $e^2$ $e^3$ $e^4$ are four collars—one for each saw—fitting the mandrels loosely, and left free to move laterally upon the mandrels, but adapted to turn with them by keys $e^5$, fitting into key-seats in the collars and into grooves $e^6$ in the mandrels. This construction is clearly shown in Figs. 4, 5, and 6. The saws are mounted upon these collars, and the collars are formed with flanges $e^7$, against which one side of the saws rest, while rings $e^8$ support the other side, the flanges $e^7$ and rings $e^8$ holding the saws between them by bolts $e^9$ passing through all three parts. By this means the saws are securely held fast to the collars, and the collars left free to move laterally upon the mandrels, but forced to revolve with the mandrels by the keys $e^5$ and grooves $e^6$.

Attached to the bars B, just forward of each of the saws, are guides $G'$ $G^2$ $G^3$ $G^4$, having forks $h'$ $h^2$ on their forward ends adapted to embrace the saws on either side, as shown. Small wooden lugs are set in the inner surfaces of the forks, against which the saws run, so that the saws will not become heated by the friction. These guides $G'$ $G^2$ $G^3$ $G^4$ are movable along the bars B, to enable them to be adjusted to fit the saws and be moved inward toward the mandrels as the saws wear down, or adapted to fit saws of different sizes. By this arrangement the saws are held in position upon the mandrels laterally entirely by the gages $G'$ $G^2$ $G^3$ $G^4$, so that in event of the saws being strained by the twisting of the lumber being sawed, or by uneven feeding, the flexibility of saws will permit them to move laterally upon the mandrel, but be held rigidly by the gage at the same time, so that when the strains are removed the gages will cause the elasticity of the saws to spring them back into place again. Thus the saws are prevented from breaking or bending under side strains.

As before stated, this invention is peculiarly applicable to the form of slab-sawing machines shown in the drawings, where long slabs are cut up into four-foot lengths by being fed to the saws by the traveling chains $a$. It frequently occurs that by reason of the carelessness of the operator in placing the slabs upon the table in an angular position, or by defects in the chains, so that they do not run at the same speed, or by the difference of thickness of the slabs, one part of the slab is fed to the saws faster than the other, and thus one or more of the saws are cramped or strained; but by my construction, with not more than two saws acting upon the same piece of the slab at the same time, means are provided to prevent this cramping affecting the saws injuriously.

I claim a great advantage by arranging the saw-mandrels in short sections, with not more than two saws on each, and with not more than two saws actings upon the same slab at the same time, as by this means the cramping of one saw can only affect the saws upon the same mandrel, and in this respect the saws are independent of each other.

Having described my invention and set forth its merits, what I claim is—

In a slab-sawing machine, a saw-table provided with parallel horizontal feeding-chains, two or more saw-mandrels out of line with each other, each mandrel having one or two saws adapted to revolve with said mandrels, but free to move laterally thereon, and a stationary gage supporting each saw at or near its rim, substantially as and for the purpose set forth.

In testimony whereof I have hereunto set my hand in presence of two subscribing witnesses.

GEORGE GOWAN.

Witnesses:
 A. L. BUGBEE,
 MILLY BUGBEE.

It is hereby certified that Letters Patent No. 288,173, granted November 6, 1883, upon the application of George Gowan, of Shell Lake, Wisconsin, for an improvement in "Circular Sawing Machines", should have been issued to Emery & Garland, of Minneapolis, Minnesota, as assignees of the entire interest in said invention; and that the proper corrections have been made in the files and records pertaining to the case in the Patent Office, and should be read in the Letters Patent to make it conform thereto.

Signed, countersigned, and sealed this 29th day of January, A. D. 1884.

[SEAL.]

M. L. JOSLYN,
*Acting Secretary of the Interior.*

Countersigned:
    BENJ. BUTTERWORTH,
        *Commissioner of Patents.*